May 12, 1959
R. E. RASMUSSEN
2,886,071
COMBINED MILK COOLING AND FILTERING DEVICE
Filed Feb. 12, 1957
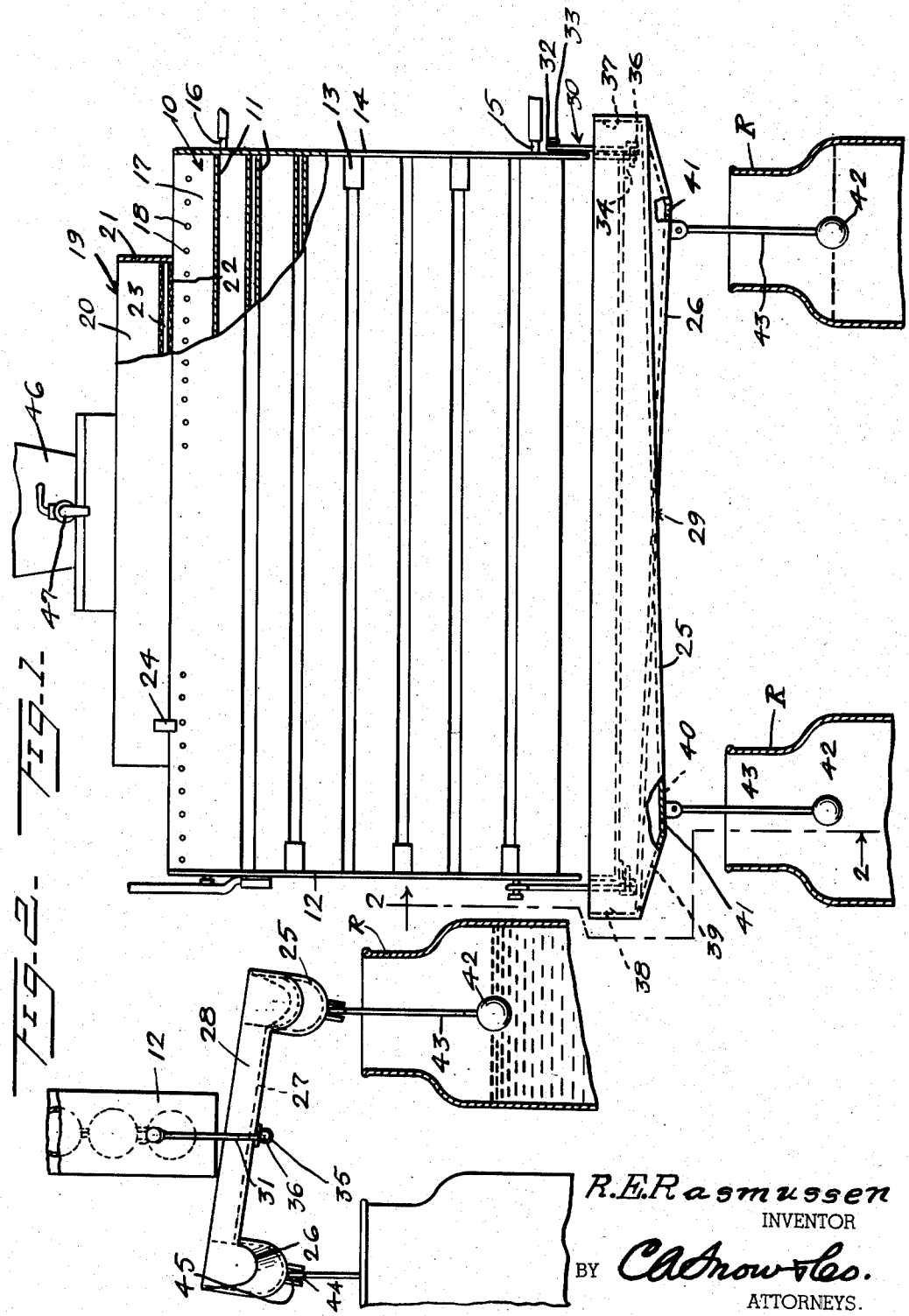
R.E.Rasmussen
INVENTOR
BY
ATTORNEYS.

United States Patent Office 2,886,071
Patented May 12, 1959

2,886,071
COMBINED MILK COOLING AND FILTERING DEVICE

Rasmus E. Rasmussen, Galt, Calif.

Application February 12, 1957, Serial No. 639,807

1 Claim. (Cl. 141—82)

This invention relates to an improved combined milk cooling and filtering device, and is an improvement over the device shown in application Serial No. 586,556, for Milk Cooling Device, now abandoned.

An object of this invention is to provide in a milk cooling device, means whereby the cooled milk will be discharged into a selected one of a pair of receptacles, and when one receptacle has been filled the milk will be automatically directed into the other receptacle, so that the filled receptacle may be removed and an empty receptacle substituted therefor without spilling the milk.

Another object of the invention is to provide in a milk cooling device an improved filter which will remove the sediment prior to the passage of the milk through the cooling process.

A further object of this invention is to provide in a milk cooling device, a delivery member at the lower end of the cascade in the form of a pair of oppositely inclined troughs with a web therebetween and a float depending from the lower end of each trough for engagement within the upper end of a milk can whereby the trough structure will be tilted for discharge of the milk into the second milk can when the first can has been filled. In this manner the flow of the milk over the cascade cooler may be continuous with an empty can being substituted for a filled can without spilling of the milk.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing:

Figure 1 is a detail side elevation partly broken away and in section of a combined milk cooling and filtering device constructed according to an embodiment of this invention.

Fig. 2 is a fragmentary sectional view taken on line 2—2 of Fig. 1.

Referring to the drawing, the numeral 10 designates generally a cascade structure which is similar to the structure embodied in co-pending application Serial No. 586,556, for Milk Cooling Device, filed by Reinhold Stickel and R. E. Rasmussen. This cascade structure embodies a plurality of horizontally disposed tubes 11 which communicate with each other at their ends through passages 13. The tubes 11 have water or other cooling means circulated therethrough and the ends of the tubes 11 are secured to vertically disposed end walls 12 and 14. A lower intake nipple 15 is carried by end wall 14 and an upper outlet nipple 16 is carried by end wall 14. At the upper end of the cascade structure 10 there is disposed a hopper or trough 17 having a plurality of spaced openings 18 through which milk is adapted to flow and the milk is then adapted to flow downwardly in a cascade operation to the bottom of the device. A filtering member 19 is mounted on the upper end of the cascade structure 10 and includes longitudinal side walls 20 with end walls 21 and a screen or perforated bottom wall structure 22. Filtering elements 23 are adapted to be disposed in the lower portion of the filter member 19 and the filter member 19 is removably held on the trough 17 by means of depending lugs 24 carried by the side walls 20 and extending downwardly over the outer sides of the trough 17.

In order to provide a means whereby the cooled milk may be automatically directed into one or the other of a pair of receptacles R which are disposed below the cooling device, I have provided a pair of oppositely inclined troughs 25 and 26. These troughs 25 and 26 are connected together by means of a webbing or plate 27 and the plate 27 has upstanding walls 28. The trough structure generally indicated at 29 is rockably supported below the cooling member 10 by means of a pair of suspension members 30. Each suspension member 30 is formed of a straight bar 31 having an upper eye 32 engageable over a pin 33 carried by each end wall 12 and 14. An angle member 34 is secured to the webbing or plate 27 at each end thereof and each bar or rod 31 is formed at its lower end with an eye or hook 35 engaging a lower pin 36 which is carried by the angle member 34. Each trough 25 and 26 is provided with a vertical end wall 37 at one end thereof, and a second vertical end wall 38 at the opposite end thereof. Each trough 25 and 26 is also formed with a downwardly and inwardly inclined bottom wall 39 extending from wall 38. The junction between bottom wall 39 and bottom wall 40 of each trough provides a low point and at this point a discharge opening 41 is provided whereby the milk may gravitatingly flow downwardly into the receptacle R.

In order to provide a means whereby the trough or discharge structure 29 will be automatically tilted, when one receptacle R is filled, to provide for discharge of the milk into the other receptacle, I have provided a float 42 which is carried by a depending stem 43. The stem 43 is dependingly and swingably disposed below the lower end of each trough and the upper end of the stem 43 loosely engages a pivot pin 44 extending through a pair of ears 45 which are fixed to the bottom wall 40. In Fig. 1 the trough structure 29 is shown in horizontal position, but it will be understood that when the cooling device is in operation the trough structure 29 will be tilted to either the right or the left as viewed in Fig. 2. The lower end of each wall 12 and 14 extends downwardly to a point wherein the trough 29 will be limited in its tilting operation after the manner shown in Fig. 2 with the flange or end wall 28 bearing against one of the lower corners of the adjacent end walls 12 and 14.

In the use and operation of this cooling device the milk is discharged from a hopper 46 through a valve 47 into the filtering member 19. The milk passes through the filtering member 19 into the trough 17 and when the volume of milk rises to the level of the openings 18 the milk will flow out of the trough 17 and gravitatingly will flow downwardly over the tubular cooling members 11. This trough member 17 cooperates with the filtering member 19 in thoroughly removing any sediment or heavy particles which are in the milk. When the milk passes off of the lower one of the tubular members 11, the milk may be dropped onto the trough structure 29 and at the start of the cooling device the trough structure 29 may be manually tilted to provide for the milk flowing into a predetermined trough 25 or 26. After the milk starts flowing over the inclined web 27 into the lower trough, such as trough 25, the weight of the milk in the trough 25 will keep the trough structure in its inclined position for discharge into the predetermined receptacle R. As the quantity of milk rises in the receptacle R float 42 will gradually move upwardly, thereby rocking the trough structure 29 so as to change the flow of milk from trough 29 into trough 26. The filled receptacle R may then be removed from within the trough 25 and an empty receptacle substituted therefor. In this manner the cooling device may be operated continuously and there will not be any spilling of the milk during the removal of a filled can or receptacle and the replacing of an empty can therefor.

What is claimed is:

In a cascade cooling system, the combination of a pair of receptacles adapted to hold milk, a frame comprised of side walls, a plurality of horizontal cooling tubes extending between said side walls, means communicating said tubes for the circulation of fluid therethrough, said frame being disposed above said receptacles, a pair of oppositely inclined troughs, a web extension between said troughs, means pivotally mounting said web on the lower end of said frame above said receptacles, each trough having an open end, adapted selectively to empty into one of said receptacles, said troughs being coextensive with said cooling tubes and located immediately therebelow, so as to collect the milk falling from said tubes, a float dependingly swingably carried by the open end of each trough operable by the level of fluid in its associated receptacle to tilt the web when an associated receptacle is filled to cause the discharge of milk from the other trough to the other of said pair of receptacles.

References Cited in the file of this patent

UNITED STATES PATENTS

| | | |
|---|---|---|
| 1,081,982 | Patton | Dec. 23, 1913 |
| 1,183,916 | Valentine | May 23, 1916 |
| 2,271,648 | Kleist | Feb. 3, 1942 |
| 2,650,427 | Mathiesen | Sept. 1, 1953 |

FOREIGN PATENTS

| | | |
|---|---|---|
| 10,272 | France | Mar. 17, 1909 |